Jan. 23, 1934.   M. NEWMARK ET AL   1,944,191
LUBRICATING DEVICE
Filed July 29, 1932
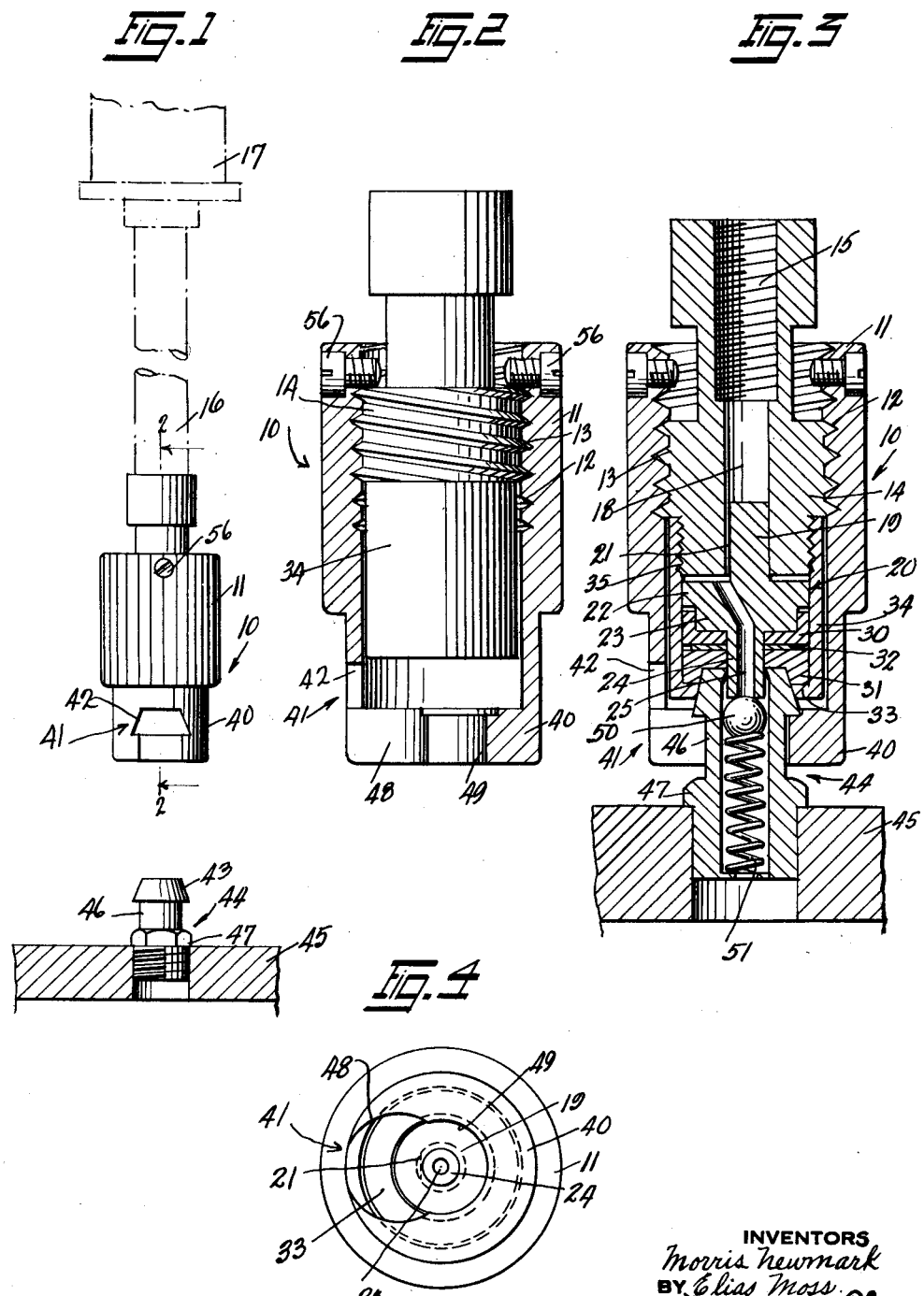
INVENTORS
Morris Newmark
BY Elias Moss
ATTORNEY Patented Jan. 23, 1934

1,944,191

UNITED STATES PATENT OFFICE 1,944,191

LUBRICATING DEVICE

Morris Newmark and Elias Moss, New York, N. Y.

Application July 29, 1932. Serial No. 625,796

4 Claims. (Cl. 285—143)

This invention relates to lubricating devices adapted to supply grease under pressure to surfaces requiring lubrication.

One of the objects of the invention is to produce a device of this character, the delivery end of which may readily be attached to and detached from the side or top of a nipple or lubricant receiving receptacle.

Another object of the invention is to produce a device of the character referred to which may be readily attached and detached from a lubricant receiving receptacle by the use of only one hand.

A further object of the invention is to provide a grease tight joint between the delivery end of the nozzle and the lubricant receiving receptacle.

Another object is to produce a device of the character described in which the maximum simplicity of construction and operation is secured.

Other objects and advantages will appear as the nature of the improvements is better understood, the invention consisting substantially in the novel arrangement and corelation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which Figure 1 is a view in elevation of my improved lubricating device in position ready to be attached to the grease receptacle leading to the surface to be lubricated.

Figure 2 is a view in elevation and partly in section at an enlarged scale taken on line 2—2 Fig. 1.

Figure 3 is a full sectional view and showing the pilot as having entered the lubricant receiving receptacle and Figure 4 is a bottom plan view looking towards the end of the barrel.

Referring now to the drawing in detail, 10 indicates a nozzle comprising a barrel 11 provided with an internal screw thread 12 which is engaged by the screw threaded portion 13 of a plunger 14. The said plunger is provided at its upper end with an internally screw threaded bore 15 adapted to receive the lower end of a tube 16 leading from a pressure lubricator 17 indicated in dot and dash lines Fig. 1. Leading from the screw threaded bore 15 is a passageway 18 into which extends a cylindrical stem 19 of a pilot 20, the said stem being flattened as at 21. The said pilot 20 is further provided with upper and lower shoulders 22 and 23 respectively and a teat or projection 24 the said shoulders and teat being provided with a branched opening or passageway 25 in communication with the passageway 18 in the plunger.

A centrally perforated cupped washer preferably made of leather 30 encircles the teat 24 and shoulder 23 and a similar washer 31 separated from the washer 30 by a metal or other hard washer 32 surrounds the teat end 24 and bears against the bottom internal flange 33 of a housing 34 screw threadedly secured to the plunger 14, the said plunger being provided with a reduced screw threaded shoulder 35 for the said purpose.

The lower end 40 of the barrel 11 is provided near the bottom thereof with a cutout 41, the upper portion 42 of which conforms to the shape of the head 43 of a nipple 44 screw threadedly secured in a bearing 45 which is to be lubricated. The nipple is further provided with a cylindrical body portion 46 and a nut portion 47. The lowermost end of the cutout 41 is of two diameters, the larger one 48 being sufficiently large enough to clear the largest diameter of the nipple head 43 and the smaller diameter 49 being large enough to clear the cylindrical body portion 46 of the said nipple, so that the device may be made to engage the nipple from either the top or side thereof.

To attach the device to the nipple 44, the barrel is either slid from one side of the nipple or pushed over the top thereof and slid into position so that the cutout portion 49 engages the body 46 of the nipple. The barrel is then rotated with one hand until the pilot 20 is tightly pressed against the nipple head 43 and the teat 24 enters the interior of the said nipple to displace the ball valve 50 against the tension of a spring 51, to permit the flow of lubricant from the pressure device 17 when the said device is operated.

A pair of screws 56 in the upper portion of the barrel 11 form means to prevent the plunger from being accidentally withdrawn from the said barrel.

It will be seen that the upper washer 30 prevents any leakage of the lubricant passing through the plunger, and the lower washer 31 prevents leakage from the pilot and nipple. The metal washer 32 tends to maintain the washers 30 and 31 fully extended against the interior of the housing 34 and prevents the said washers from adhering together.

From the foregoing it will be seen that we have provided a lubricating device which may be readily attached to or detached from a lubricant receptable, either from the top or side thereof, by the use of only one hand, and one which will form a leak proof joint or seal with the said receptacle.

Having described our invention what we claim as new and desire to secure by Letters Patent is:

1. A nozzle adapted to be secured to a pressure lubricating device and lubricant receptacle comprising a barrel having a cutout for engagement with the said receptacle, a plunger operatively mounted in the said barrel and having a bore in communication at one end with the pressure device, a perforated pilot operatively mounted at the opposite end of the said bore, a reduced shoulder on the said pilot, a teat projecting from the said shoulder, a cupped non-metallic washer on the said teat encircling the said shoulder, a second like washer on the teat disposed in the opposite direction, a spacing washer between the two first mentioned washers and a housing to maintain the pilot and washers in place.

2. A nozzle adapted to be secured to a pressure lubricating device, comprising a barrel, a plunger rotatably and slidably mounted therein and having a bore in communication with the pressure device, a housing secured to the bottom of the plunger, a pilot in the housing, the said pilot having a perforation in communication with the plunger bore, an upper non-metallic cupped washer on the pilot, a lower non-metallic cupped washer on the pilot, a separator between the said cupped washers and means on the housing against which the lower cupped washer bears.

3. A nozzle adapted to be secured to a pressure lubricating device, comprising a barrel, a plunger movably mounted therein, and having a bore in communication with the pressure device, a housing at the bottom of the plunger, a pilot in the housing, the said pilot having a perforation in communication with the plunger bore, a pair of non-metallic washers at the lower end of the pilot, and a separator between the said washers.

4. A nozzle adapted to be secured to a pressure lubricating device and lubricant receptacle comprising a barrel having a cutout for engagement wi h the said receptacle, a plunger operatively mounted in the said barrel and having a bore in communication at one end with the pressure device, a perforated pilot at the opposite end of the said bore, a teat projecting from the pilot, a non-metallic washer on the said teat, a second non-metallic washer below the first mentioned washer, a separator between the said washers, and a housing to maintain the pilot and washers in place.

MORRIS NEWMARK.
ELIAS MOSS.